Dec. 13, 1927.  1,652,171
L. C. HUFF
APPARATUS FOR DRAWING OFF GASES AND LIQUIDS FROM PRESSURE SYSTEMS
Filed Aug. 16, 1923
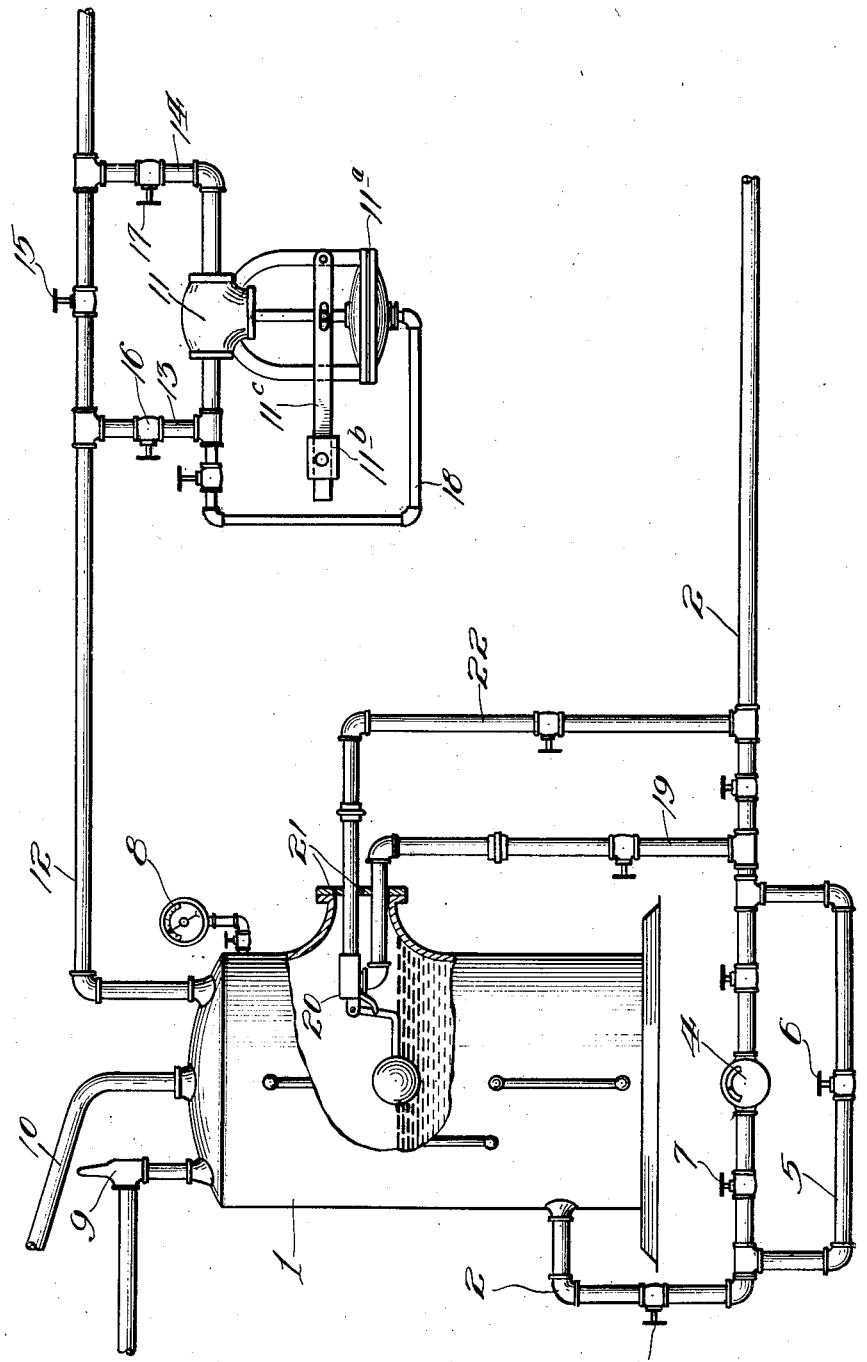

Patented Dec. 13, 1927.

1,652,171

UNITED STATES PATENT OFFICE.

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

APPARATUS FOR DRAWING OFF GASES AND LIQUIDS FROM PRESSURE SYSTEMS.

Application filed August 16, 1923. Serial No. 657,751.

This invention relates to improvements in apparatus for drawing off liquid materials from pressure systems, and refers more particularly to an apparatus particularly adapted for use in the cracking system in which oil is distilled under pressure to produce low boiling point hydrocarbons.

Among the objects of the invention are to provide an apparatus for uniformly drawing off or releasing gas and distillate from a pressure system, thereby maintaining a more constant pressure on the system and eliminating fluctuations and variations in pressure usually caused by manual control, which are detrimental to good conversion conditions; to provide an apparatus in which automatic pressure control is maintained by controlling the gas release line, and a construction providing for drawing off and metering the liquid distillate while under pressure, and automatically controlling the liquid level maintained in the distillate receiver.

The single figure is a diagrammatic side elevational view of the apparatus with parts broken away, and only such parts of the mechanism shown as is necessary for proper understanding of the invention.

Referring to the drawing, at 1 is shown a receiving tank which is connected into a cracking system, not shown. The invention is described in connection with an oil cracking system, but it is understood that it is as adaptable to any type of pressure system where a uniform gaseous pressure is essential and the liquid distillate drawn off either continuously or intermittently.

The receiving tank is equipped with liquid drawoff line 2, controlled by a valve 3, in which line is interposed a liquid metering device 4 which has a by-pass line 5 controlled by valves 6 and 7 around the metering gauge. The receiving tank is also equipped with a pressure gauge 8 and a relief safety valve 9. At 10 is shown the distillate inlet line from the condenser of the system, not shown. The pressure control is manipulated by a balanced relief valve 11 connected by means of the lines 12 and 13 to the receiving tank. A line 14 completes the by-pass in the line 12 which is controlled by valves shown at 15, 16 and 17. The balanced relief valve is of a common type, and is novel to the present invention only in so far as it is employed in combination with the rest of the apparatus, to maintain a constant gas pressure on the receiving tank.

In the lower part of the valve 11 is a diaphragm arrangement 11$^a$, pressures upon which are controlled by means of an adjustable weight 11$^b$ on the lever arm 11$^c$. A line 18 containing a liquid such as water or oil is interposed between the line 13 and the bottom of the diaphragm chamber 11$^a$.

The gas is released from the top of the receiving tank by the balanced valve 11, operated by the pressure in the still acting against the diaphragm which opens the balanced valve against the weighted lever 11$^c$ which has been adjusted to counterbalance a given pressure on the diaphragm. Any increase in pressure above that for which the weight is set, will raise the lever and allow the valve to open and release gas from the system.

The liquid or distillate on the other hand is metered under pressure being drawn off from the receiving tank through the line 2, passing through the metering gauge shown at 4 and directed back through the line 19 to the float valve 20 positioned in the receiver. This float valve is attached to a manhole plate shown at 21 in the side of the receiver, and may be readily removed for adjustment or repair. The liquid passing from the float valve is directed through the line 22 back to the distillate drawoff line 2, and flows thence to a storage tank, not shown. The pressure on the liquid is released at the float valve, and as explained, is directed to suitable run-down tanks or storage tanks, as described.

By releasing the liquid after it passes through the meter, it is measured while in the purely liquid state, and is not effected by the liquid gassing as would be the case if measured after the pressure is released, which would cause the meter to run fast and give an inaccurate registration or reading.

The float valve located at a predetermined elevation in the tank will discharge the liquid uniformly from the system, and maintain a given oil level in the receiving reservoir.

Both the gas and distillate released are automatic in their operation, and dispense with a pressure tender whose duty it is to release gas and distillate from the system by manually operated valves.

This installation is therefore a labor saver, as any number of stills can be so equipped and operated from a single receiver house. This installation also maintains a uniform pressure on the stills, which is beneficial in the conversion and cracking of the oil, and results in a more efficient operation, and consequently an increased quantity and a better quality product.

I claim as my invention:

1. In an automatic control for pressure systems, the combination with a collecting means of means for maintaining a predetermined vapor pressure in said collecting means, a liquid draw-off from said collecting means, a liquid metering gage interposed in said liquid draw-off, a float valve interposed in said liquid draw-off beyond said metering gage, said float valve functioning to maintain a predetermined liquid level in said collecting means and to release the pressure on the liquid subsequent to its passage through said metering gage.

2. An automatic controlling mechanism for pressure systems, comprising a liquid collecting tank, means for maintaining a predetermined pressure in said tank, a liquid outlet means form said tank, a metering gage disposed in said liquid outlet means, means within the collecting tank for controlling the flow of liquid through said liquid outlet means and for releasing the pressure on the liquid subsequent to its passage through said metering gage.

3. In an automatic control for pressure systems, the combination with a collecting means, of means for maintaining a constant predetermined pressure upon the system, a liquid draw-off line communicating with said collecting means, means interposed in said liquid draw-off line for metering the liquid drawn off from said collecting means, and means automatically maintaining a controlled liquid level in the collecting means and releasing the pressure on the metered liquid.

4. In an automatic control for pressure systems, the combination with a collecting means, of automatic means for releasing accumulated gases from said collecting means and for maintaining a predetermined pressure in said collecting means, a liquid metering gauge and a float valve interposed in a liquid draw-off line for maintaining a predetermined liquid level in said collecting means and for releasing the pressure on the liquid subsequent to its passage through said metering gauge.

LYMAN C. HUFF